Nov. 6, 1962 G. B. STONE 3,061,995
HAY CRUSHER WITH PICKUP
Filed Oct. 7, 1959 2 Sheets-Sheet 1

Guthrie B. Stone
INVENTOR.

Nov. 6, 1962 G. B. STONE 3,061,995
HAY CRUSHER WITH PICKUP
Filed Oct. 7, 1959 2 Sheets-Sheet 2
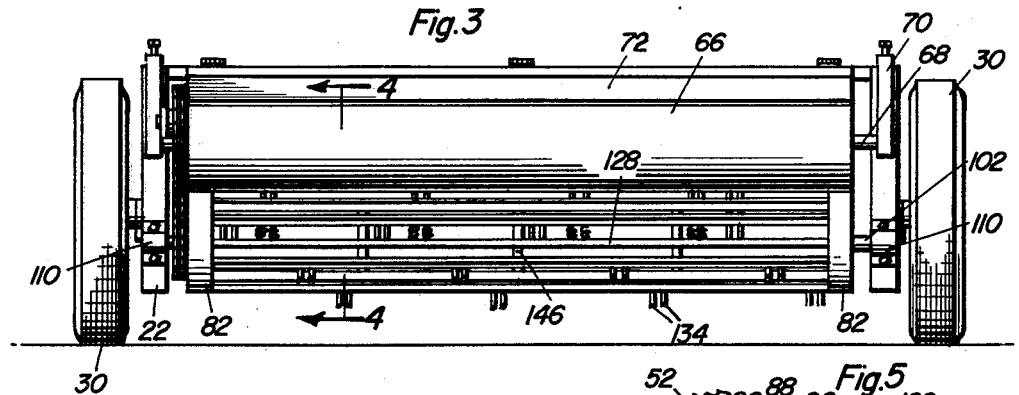
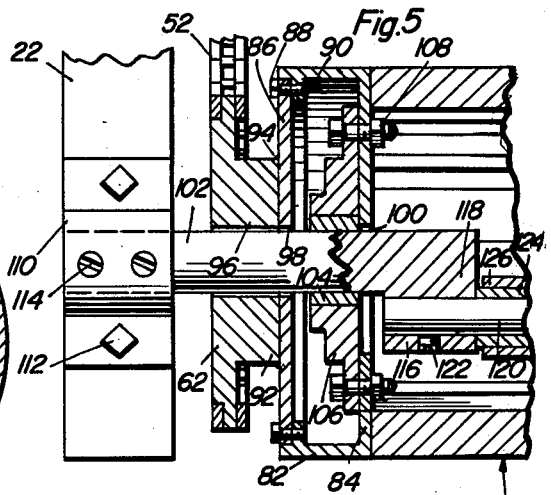
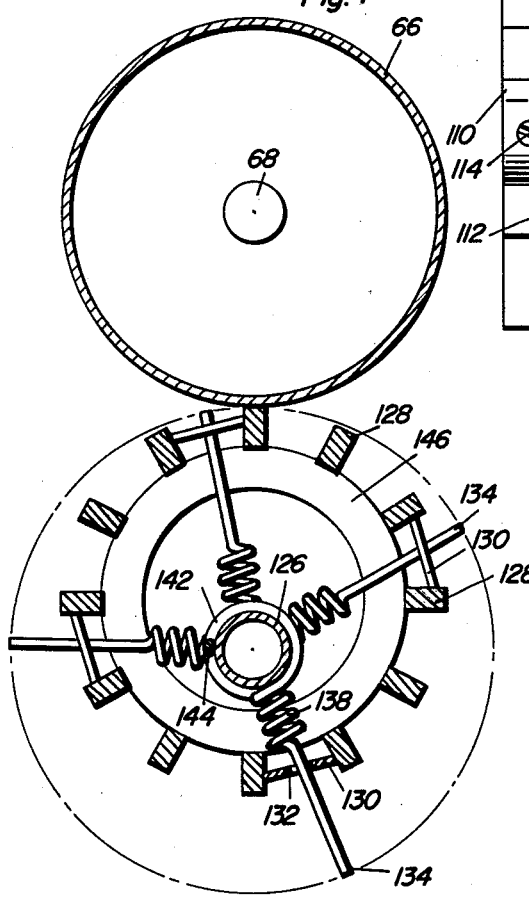
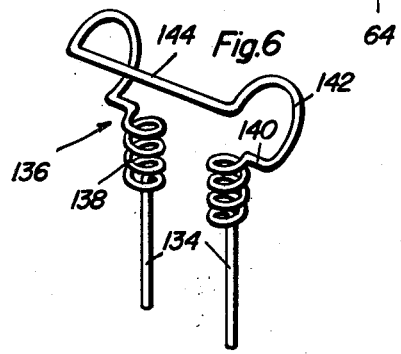
Guthrie B. Stone
INVENTOR.

United States Patent Office 3,061,995
Patented Nov. 6, 1962

3,061,995
HAY CRUSHER WITH PICKUP
Guthrie B. Stone, % Stone Conveyor Co. Inc.,
Honeoye, N.Y.
Filed Oct. 7, 1959, Ser. No. 845,001
5 Claims. (Cl. 56—1)

The present invention generally relates to a device for crushing hay and more particularly to such a device having a novel pickup assembly incorporated into the lower pressure roller.

In recent years, it has been found that hay will cure in a more efficient manner if the stems of the hay are broken by running the hay through a pair of pressure rollers which will crush the hay stems or stalks thus allowing more complete drying or curing of the hay. One of the existent problems in the use of hay crushers is the problem of picking up the hay from a windrow and extending it through and between the pressure rollers while maintaining the cost of the device at a relatively low level. Therefore, it is the primary object of the present invention to provide a hay crusher which incorporates a pickup assembly which will effectively pick up the hay from the windrow which pickup assembly is incorporated into the lower pressure roller which will materially reduce the over-all cost of the hay crusher while increasing the effectiveness of the pick up operation.

A further object of the present invention is to provide a hay crusher with a pickup assembly incorporated into the lower pressure roller with the lower pressure roller also being provided with omitted areas receiving the pickup assembly so that the pressure rollers will not only crush the stems or stalks but also will break them laterally at predetermined spaced points.

Another important object of the present invention is to provide a hay crusher with a pickup assembly incorporated into the lower pressure roller which includes a novel spring tines assembly together with a stripper mechanism for the spring tines so that the tines which revolve about an axis eccentric with the axis of rotation of the lower pressure rollers so that the tines will be spring mounted but yet rotatable and slidable in relation to the stripping mechanism.

Yet another important feature of the present invention is to provide a hay crusher with a pickup assembly incorporated into the lower roller thereof which is simple in construction, dependable, long lasting, easy to use, effective in operation, easy to repair and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a rear elevational view of the hay crusher;

FIGURE 4 is an enlarged vertical sectional view taken substantially upon a plane passing along section line 4—4 of FIGURE 3 illustrating the details of the pickup assembly and the relationship of the two pressure rollers;

FIGURE 5 is a detailed longitudinal sectional view illustrating the manner of mounting of the lower pressure roller and the mounting of the pickup assembly which is stationarily disposed in relation to rotational movement; and FIGURE 6 is a perspective view of one of the pickup tine structures.

Figure 1:
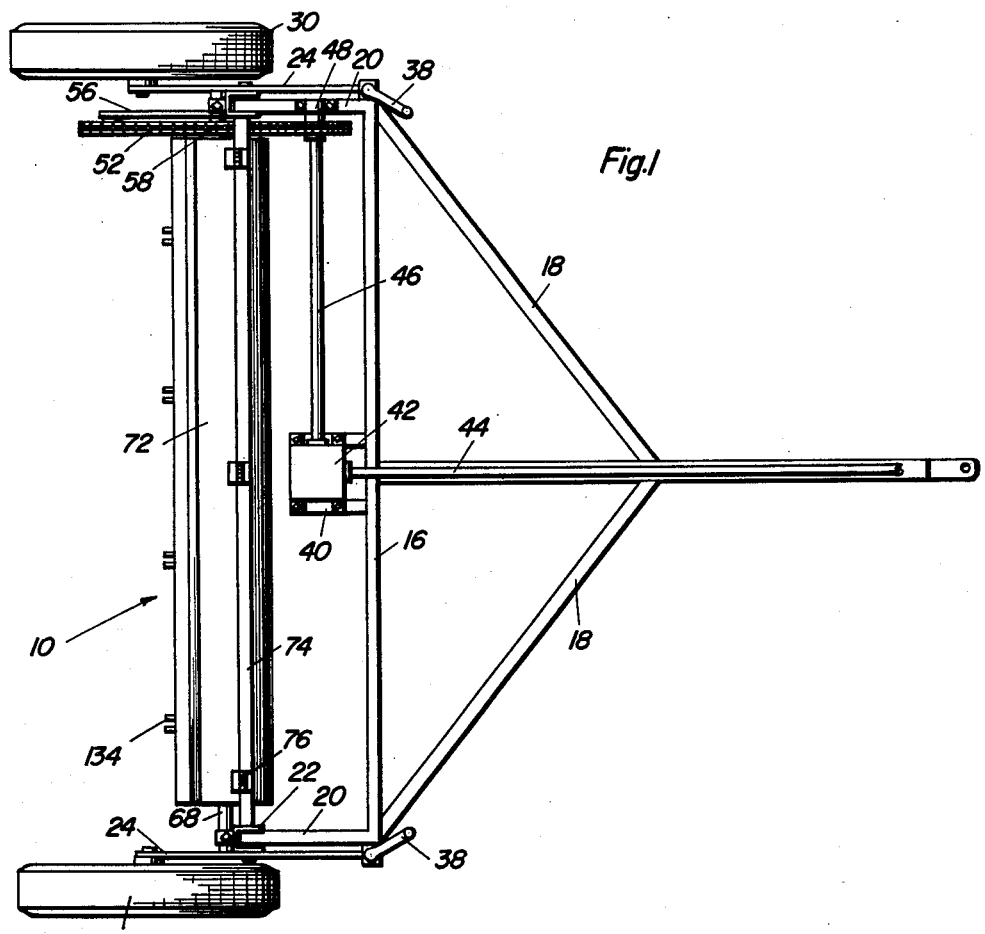
FIGURE 1 is a plan view of the hay crusher of the present invention.
Figure 2:
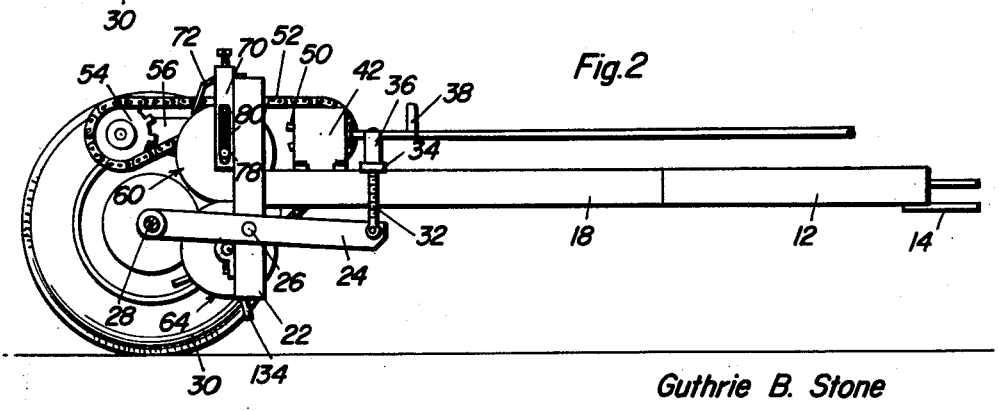
FIGURE 2 is a side elevation of the construction of FIGURE 1 with one of the wheels of the hay crusher removed.

Referring now specifically to the drawings, the numeral 10 generally designates the hay crusher with a novel pickup of the present invention which includes a forwardly extending tongue 12 having forwardly projecting lugs 14 thereon forming a clevis for attachment to a tractor drawbar or the like. Any suitable mechanism may be provided for attachment of the tongue 12 to a towing vehicle. The tongue 12 extends rearwardly and is rigidly mounted to a transverse frame member 16 and the ends of the transverse frame member are rigidified by forwardly inclined brace members 18 which define generally a triangular assembly with the tongue 12 thereby providing a rigid framework. Extending rearwardly from each outer end of the transverse frame member 16 is a trailing supporting arm 20 which in turn is connected to a vertical frame element 22 with the vertical frame elements 22 being disposed in spaced parallel vertical relation.

Pivotally supported from the vertical frame members 22 adjacent the lower end thereof is a pair of support arms 24 pivotally attached to the frame members 22 by a pivot pin 26. The rear ends of the support arms 24 are provided with an axle spindle 28 to which is rotatably attached a supporting wheel 30 of any suitable construction such as a wheel having a pneumatic tire thereon. The forward end of the support arm 24 is swivelly attached to the lower end of a threaded rod 32 which extends upwardly through a lug 34 on a frame member 16 or on the frame member 20 with the threaded rod 32 having a threaded nut 36 on the upper end thereof with the nut 36 having a handle 38 attached thereto whereby rotation of the handle 36 will cause elevational changes in the wheel 30 for raising and lowering the frame assembly. The threaded rod 32 may extend through the lug 34 with sufficient clearance to accommodate the change in angular position of the threaded rod 32 during alterations in the elevational relationship between the wheels 30 and the supporting frame.

The frame 16 is provided with a pair of rearwardly extending supporting brackets 40 adjacent the center thereof which supports a gear transfer housing 42 having a power input shaft 44 extending forwardly above the tongue 12 and connected to a suitable power take-off mechanism of the towing vehicle. Extending laterally outwardly from the gear transfer case 42 is a laterally extending power shaft 46 having the outer end thereof journaled on a bearing assembly 48 carried by the rearwardly extending supporting frame member 20. Adjacent the outer end of the shaft 46, there is provided a sprocket gear 50 which engages an endless sprocket chain 52. The sprocket chain 52 extends rearwardly and passes over an idler sprocket gear 54 carried by a rearwardly extending arm 56 and then extends forwardly and over a sprocket gear 58 for driving an upper pressure roller generally designated by the numeral 60 and then passes over and around a lower sprocket gear 62 connected with a lower pressure roller generally designated by the numeral 64.

The upper pressure roller 60 generally is in the form of a cylindrical drum 66 which has the end shafts 68 thereof journaled in a bearing block slidable in a guide 70 which is spring loaded downwardly so that the upper pressure roller 60 will be spring biased towards the lower pressure roller. The upper pressure roller 66 is also provided with a scraper 72 for connection to a transversely extending supporting beam 74 by bracket members 76 whereby the hay or other material will be scraped from the upper roller while the spring biased block 78 supports the shaft 68 under the compression spring 80 which supports the shaft and holds it against the upper pressure roller against the lower pressure roller.

The lower pressure roller 64 includes cylindrical end portions 82 which bear against the upper pressure roller 66. The cylindrical portions 82 each include an inner plate 84 and a removable outer plate 86 with the removable outer plate 86 being retained in position by bolts 88 extending into a peripheral internal flange 90 on the cylindrical end portions 82. The sprocket gear 62 which receives the drive chain 52 is provided with an inwardly extending offset portion 92 secured to the removable plate 80 as by welding 94 or the like. Extending centrally through a bore 96 in the sprocket gear 62 and extending through an aperture 98 in the plate 86 and through an elongated slot-like aperture 100 in the plate 84 is a shaft 102 which has a bearing member 104 journaling the shaft 102 in a bearing plate 106 secured to the plate 84 by fastening bolts 108.

The outer end of the shaft 102 is received within a bearing housing 110 supported on the vertical frame member 22 by virtue of fastening bolts 112 and the shaft 102 is held rotationally stationary by setscrews 114. The inner end of the shaft 102 is provided with a laterally extending offset portion 116 having a bore 118 extending therethrough receiving a stationary shaft 120 which is secured non-rotatably in the eccentric portion 116 by a setscrew 122. The shaft 120 is provided with bronze bushings 124 which rotatably support a tubular shaft 126 for rotation about the stationary shaft or rod 120 which extends from end-to-end of the lower pressure roller. Thus, as the cylindrical portions 82 of the lower pressure roller are rotated, the shaft 120 will be held in a stationary eccentric position in relation to the rotational axis of the lower pressure roller.

Extending between the inner plates 84 is a plurality of circumferentially spaced solid bars 128 which are preferably welded to the plates 84 thus providing a rigid rotatable unit. Extending between pairs of the bars 128 are guide plates 130 having enlarged apertures 132 therein for slidably and pivotally receiving a pair of tines 134 on a tine assembly generally designated by the numeral 136. The pair of tines 134 are in parallel relation to each other and terminate at their inner ends in a spiral coil spring 138. The spiral springs each terminate in an outwardly extending terminal end portion 140 and a circular portion 142 with the inner ends of the circular portions 142 being interconnected by a longitudinal portion 144. The circular portions 142 are of more than one-half of a circle and will snap onto the pipe or shaft 126 for rotation therewith as the shaft rotates about the rod or shaft 120 during rotation of the lower pressure roller.

Due to the eccentric relationship of the tubular shaft 126 in relation to the rotational axis of the cylindrical end portions 82 and the bars 128, the tines 134 will project downwardly and slightly forwardly when they are at their lowermost positions and as they begin movement forwardly and upwardly, the tines will begin to be retracted through the apertures 132 which will serve to effectively strip the tines. Then as the tines approach the contacting point of the upper pressure roller 66, they are completely retracted beyond the confines of the cylindrical end portions 82 so that they will not contact the crushing rollers 66. However, the hay picked up by the tines will be effectively passed between the upper and lower pressure rollers so that the hay will be effectively crushed by the outer surfaces of the bars and the edges of the transverse bars 128 will coact with the point of contact with the upper pressure roller for effectively breaking the crushed hay stems or stalks thereby further crushing the hay for subsequent discharge for further curing. Also, the bars 128 are rigidified and reinforced by annular reinforcement members 146 engaging the inner surface thereof and preferably welded thereto. Also, the fingers or tines 34 are staggered over the surface of the lower pressure roller so that the are evenly distributed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hay crusher comprising a mobile frame, a powered upper pressure roller mounted on the frame and having a smooth continuous surface, a powered lower pressure roller of hollow construction mounted on the frame in contacting relation with the upper pressure roller for crushing hay passed between the rollers, said lower pressure roller including a plurality of pickup fingers mounted thereon for picking up the hay and urging it towards the point of contact between the upper and lower pressure rollers for effective crushing of the hay, a stationary shaft within the lower roller in eccentric relation to the axis of rotation thereof, said fingers being rotatably mounted on said shaft whereby rotation of the lower pressure roller will cause the fingers to extend and retract in relation to the lower roller, said shaft being remotely spaced from the point of contact between the rollers whereby the fingers are retracted when the fingers pass the point of contact with the upper pressure roller.

2. The structure as defined in claim 1 wherein said lower pressure roller includes cylindrical outer end portions engaging the peripheral surface of the upper pressure roller and a plurality of longitudinally extending bars disposed in circumferentially spaced relationship for presenting a plurality of edges to the point of contact with the upper pressure roller thereby effectively breaking the hay as well as crushing it.

3. The structure as defined in claim 2 wherein a plurality of guide plates is provided between adjacent bars with the guide plates having openings therein receiving and guiding the fingers.

4. The combination of claim 3 wherein said upper pressure roller is spring urged towards the lower pressure roller, and a scraper mounted on the frame in engagement with the peripheral surface of the upper pressure roller for cleaning the upper pressure roller.

5. The combination of claim 4 wherein each of said fingers is provided with a spiral spring at the inner end thereof, and each spiral spring having a substantially U-shaped inner end, a tubular rotatable shaft supported by said stationary shaft, the U-shaped inner ends of the springs snapping onto the rotatable shaft, and a connecting longitudinal member interconnecting the U-shaped snap-on wire elements into pairs.

References Cited in the file of this patent

UNITED STATES PATENTS

| | | |
|---|---|---|
| 2,595,177 | Stevens | Apr. 29, 1952 |
| 2,641,101 | Redrow | June 9, 1953 |
| 2,644,292 | Oberhotz et al. | July 7, 1953 |
| 2,711,622 | Cunningham | June 28, 1955 |
| 2,811,819 | Heth | Nov. 5, 1957 |
| 2,909,024 | Van Der Lely et al. | Oct. 20, 1959 |